United States Patent [19]

Matsumoto et al.

[11] 4,381,910

[45] May 3, 1983

[54] APPARATUS FOR MOLDING PULLEY FOR TOOTHED BELTS

[75] Inventors: Hideo Matsumoto, Toyota; Minoru Takahashi, Okazaki; Marehito Kato, Toyota, all of Japan

[73] Assignee: Aisin Seiki Kabushiki Kaisha, Kariya, Japan

[21] Appl. No.: 350,184

[22] Filed: Feb. 19, 1982

[30] Foreign Application Priority Data

Feb. 23, 1981 [JP]  Japan ............................ 56-24310[U]

[51] Int. Cl.$^3$ ...................... B29C 17/00; B29D 15/00
[52] U.S. Cl. ..................................... 425/398; 249/160
[58] Field of Search ............... 425/78, 352, 354, 355, 425/388, 393, 394, 398, 397; 249/160

[56] References Cited

U.S. PATENT DOCUMENTS

| | | | |
|---|---|---|---|
| 2,767,438 | 10/1956 | Pingel | 425/78 |
| 3,020,589 | 2/1962 | Maritano | 425/78 |
| 3,496,611 | 2/1970 | Terdig | 249/160 X |
| 3,516,122 | 6/1970 | Schwartz | 425/398 |
| 3,651,185 | 3/1972 | Menkel | 425/398 X |
| 3,692,454 | 9/1972 | Kruger | 425/398 X |
| 3,694,127 | 9/1972 | Takahashi et al. | 425/352 |
| 3,724,803 | 4/1973 | Goldfarb | 249/160 X |
| 3,773,446 | 11/1973 | Bonini | 425/354 X |
| 3,891,367 | 6/1975 | Signora | 425/354 X |
| 3,909,167 | 9/1975 | Signora | 425/352 X |
| 4,008,021 | 2/1977 | Fedrigo et al. | 425/354 X |

*Primary Examiner*—J. Howard Flint, Jr.
*Attorney, Agent, or Firm*—Burns, Doane, Swecker & Mathis

[57] ABSTRACT

An inventive apparatus for molding a toothed pulley is equipped with an upper plate, a lower plate, and a punch attached to the bottom surface of the upper plate for vertical movement, in which a die holder is provided on the lower plate, and a plurality of dies, formed to include tooth molds having different, increasing tooth heights from one die to the next, are arranged vertically in the holder.

5 Claims, 11 Drawing Figures

APPARATUS FOR MOLDING PULLEY FOR TOOTHED BELTS

BACKGROUND

This invention relates to a molding apparatus for providing a toothed wheel, a toothed pulley or the like by means of pressing work. More particularly, the invention relates to a molding apparatus in which a pressing machine uses a stacked array of molding dies having different tooth heights from one die to the next to form highly accurate teeth on the cylindrical wall portion of a bottomed cylindrical body with a single press-molding stroke.

Two manners are employed conventionally to form teeth on an intermediate product which is cylindrical in shape. One manner is to form the teeth by extrusion molding, and the other is to form the teeth in small increments by means of drawing. With the extrusion manner, however, the entire height of a tooth is molded at one time in a single die. This causes the molded tooth to sag to a large degree, and/or to form draw or shrinkage marks at the corner portions of the tooth, making it impossible to obtain a tooth of the prescribed shape. Consequently, in order to prevent such sagging as well as the formation of draw or shrinkage marks, the thickness of the cylindrical wall portion of the starting stock is enlarged with respect to the thickness of the tooth portion, but this greatly increases the molding load. The result is scoring of the die and molded surface, which in turn roughens the face of the molded tooth and shortens the life of the mold or dies to a great extent.

With the drawing manner, on the other hand, scoring does not occur since drawing is carried out by a stroke applied in small increments. This is disadvantageous, however, in that costs are raised owing to a prolonged molding operation and an increase in mold or die upkeep costs.

SUMMARY OF THE INVENTION

The present invention seeks to provide an apparatus for molding a toothed wheel, or a toothed pulley, that eliminates the shortcomings encountered in the prior art.

Accordingly, the object of the present invention is to provide a molding apparatus which reduces the molding load due to ironing, i.e., drawing or pressing work as well as the scoring of the die and molded surface. Another object of the invention is to provide a molding apparatus which applies a correction at the final molding stage to eliminate the sagging or draw that occurs at the initial molding stage, thereby forming highly accurate teeth with a single press-molding stroke. A further object of the invention is to provide a molding apparatus assuring an extended mold or die lifetime.

The present invention provides improvement in a pressing machine, particularly an apparatus for molding a toothed pulley for a toothed belt or the like, equipped with an upper plate, a lower plate, and a punch attached to the bottom surface of said upper plate for, preferably vertical movement, which improvement comprises that a die holder is provided on said lower plate, and in that a plurality of dies, formed to include tooth molds having different tooth heights from one die to the next, are arranged, preferably vertically, in said die holder. The depth or height of the tooth formed on each die is different, i.e., increasing in an order as the punch proceeds so as to allow the blank gradually to be deformed, resulting in finished teeth with good dimension and fittness to the mold shape under application of less pressing load.

Reference will now be had to the accompanying drawings for a detailed description of an embodiment of the present invention, in which the drawings are shown for better illustration of the invention and not for limitation thereof.

BRIEF DESCRIPTION OF THE DRAWINGS

FIGS. 3 through 5 are sectional views showing a tooth molding process performed in accordance with the apparatus of present invention, in which FIG. 3 shows an initial molding stage, FIG. 4 shows a intermediate molding stage, and FIG. 5 shows a final molding stage.

DETAILED DESCRIPTION OF THE INVENTION

Figure 1:
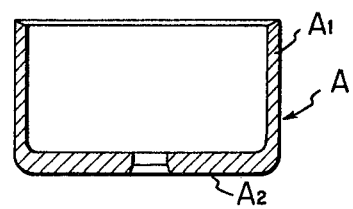
FIG. 1 is a sectional view of a blank.

FIG. 1 is a sectional view of a blank subjected to a tooth molding operation according to the present invention. The blank A, which is an intermediate product formed beforehand into a cylindrical body, has a circumferential wall portion $A_1$ and a bottom $A_2$.

Figure 2:
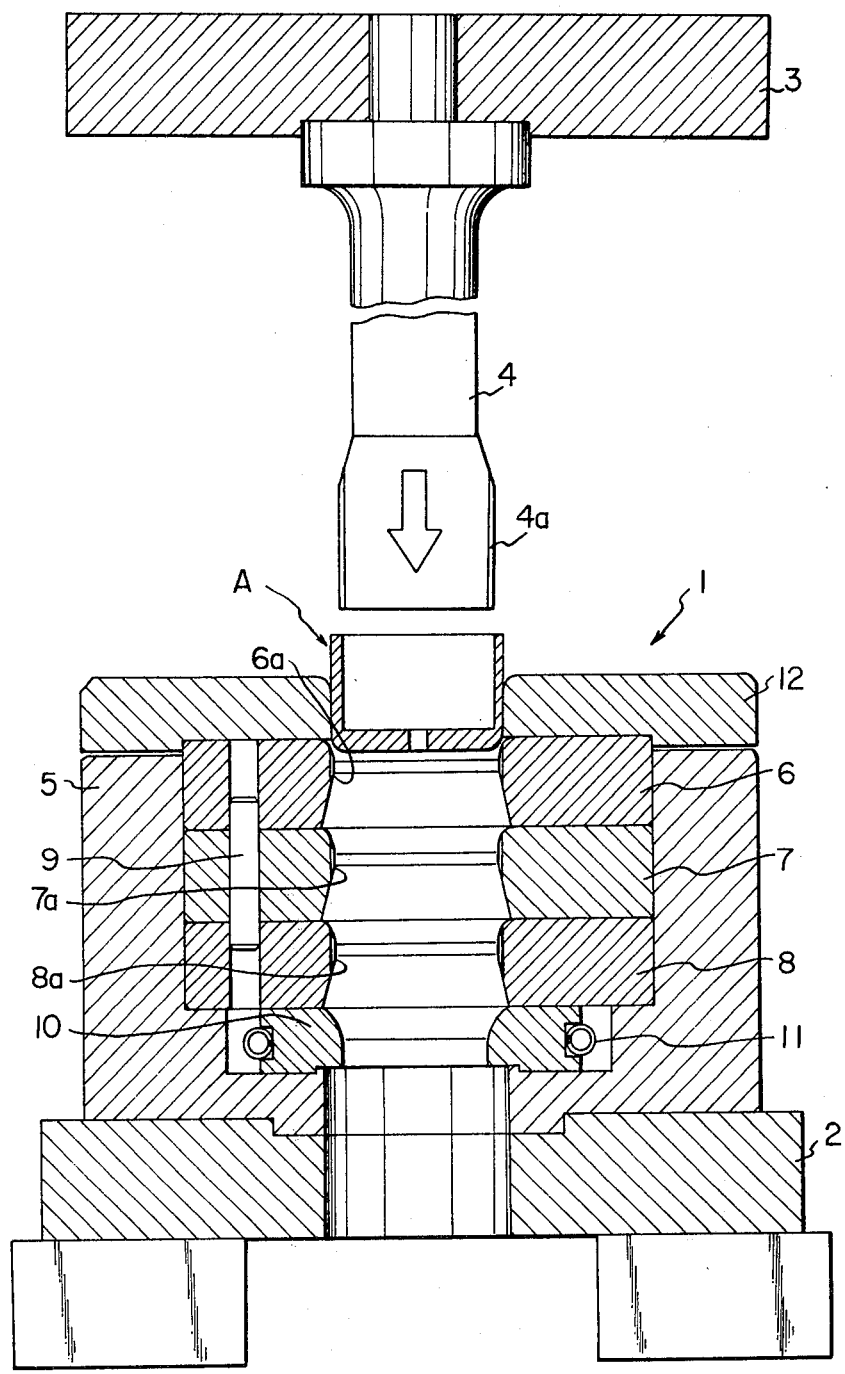
FIG. 2 is a diagrammatic view showing a pressing machine in its entirety, with the apparatus of the present invention mounted thereon.

FIG. 2 is a diagrammatic view showing a pressing machine having the apparatus of the present invention mounted thereon. Numeral 1 denotes the pressing machine, which is equipped with a lower plate 2 and an upper plate 3. Numeral 4 denotes a punch supported on the bottom surface of the upper plate 3 for vertical movement by lifting means, not shown. A tooth mold 4a of a prescribed shape is formed on the outer circumferential surface of the punch 4 at the lower end portion thereof. In the drawing, other teeth 4a circumferentially arranged on the punch 4 are not shown for illustrative purpose.

Numeral 5 denotes a die holder which is fixedly secured on the lower plate 2. Fixedly secured within the die holder 5 are three vertically arranged dies 6, 7, 8 which are positioned by a positioning pin 9. The uppermost die 6 is a coarse die, followed by an intermediate die 7 and a finishing die 8 at the bottom. The coarse die 6, intermediate die 7 and finishing die 8 have respective tooth molds 6a, 7a, 8a formed on the inner circumferential surface thereof to confront the tooth mold 4a of the punch 4. The tooth mold 6a formed in the coarse die 6 is shallower than the tooth mold 7a in the intermediate die 7, which is in turn shallower than the tooth mold 8a of the finishing die 8. Thus the tooth molds grow progressively deeper from die 6 to die 7 and from die 7 to die 8 to form a gradually higher axially extending tooth, or deeper groove, in the blank A from one molding stage to the next, as will be described in further detail below.

Numeral 10 denotes a movable stopper which is split into four sections. The movable stopper 10, constituting the lowermost stage of the die holder, is attached to the die holder 5 so as to underlie the lowermost molding die 8, and is movable to the left and right with its outer rim supported by means of a coil spring 11. Numeral 12 denotes a blank holder provided at the upper most stage of the die holder 5.

Reference will now be had to FIGS. 2 through 5 to describe a molding process as performed by the apparatus having the construction described above.

Figure 3:
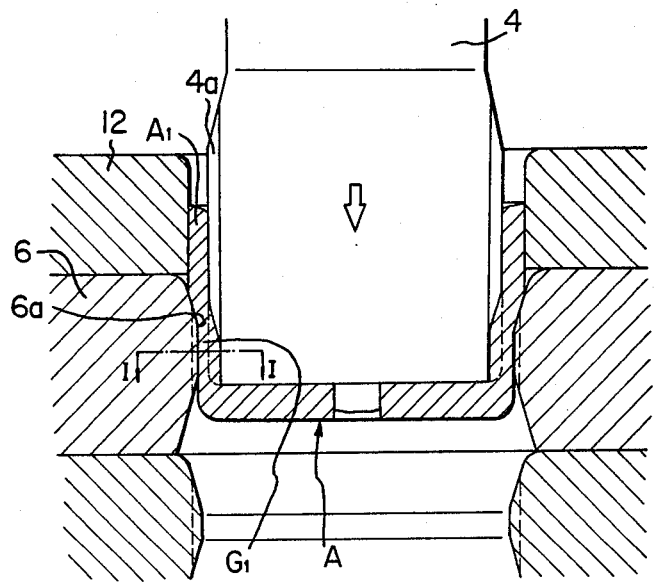
Figure 3A:
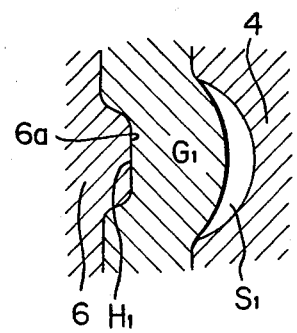
FIG. 3A is a sectional view taken along the line I—I of FIG. 3.

Fist, as shown in FIG. 2, the blank A is disposed within the blank holder 12 and is urged downwardly by lowering the punch 4, that is, in the direction of the arrow. This subjects the blank A to a drawing molding operation, wherein the blank A is pressed between the coarse die 6 and the punch 4, causing the punch 4 to spread the wall $A_1$ of the blank A outwardly, as shown in FIG. 3, thus resulting in an ironing operation. At this time the tooth mold 4a of the punch 4 and the tooth mold 6a of the coarse die 6 cause deformation of the blank so that teeth $G_1$ are formed on the circumferential surface of the blank, namely on the wall portion $A_1$, as depicted in FIG. 3A. Here, since the tooth mold 6a facing the tooth mold 4a of the punch 4 is the shallowest or lowest of the tooth molds, neither the die nor the molded surface is scored at the start of molding, and there is but little molding load. In addition, the tooth formed on the blank A at this stage is as yet incomplete since a space $S_1$ remains between the blank and the punch 4, as shown in FIG. 3A. Furthermore, shallow, axially extending grooves $H_1$, corresponding to the tooth mold 6a of the coarse die 6, is formed in the teeth $G_1$.

Figure 4:
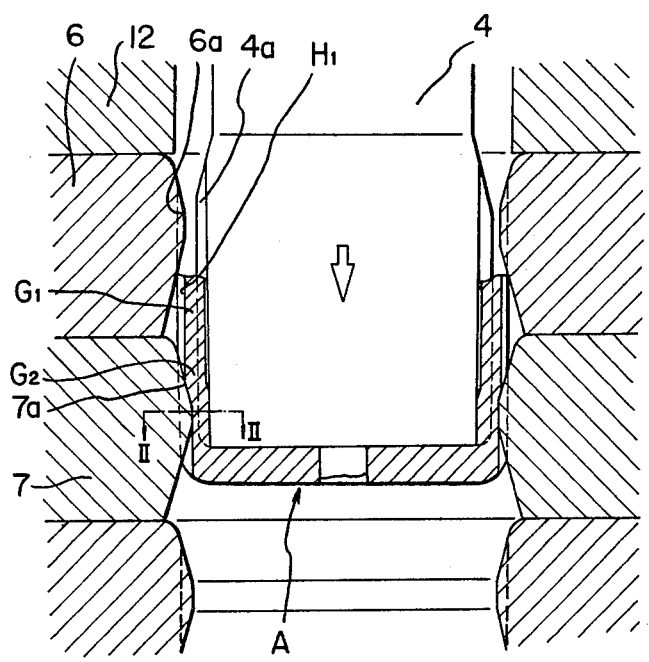
Figure 4A:
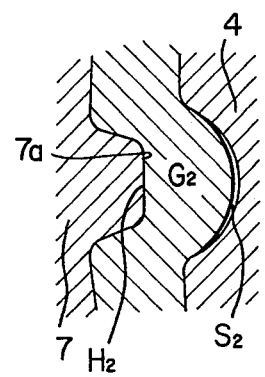
FIG. 4A is a sectional view taken along the line II—II of FIG. 4.

In FIG. 4, the punch 4 is lowered further so that the blank A is subjected to further pressure between the punch 4 and the intermediate die 7. Now the teeth $G_1$ and grooves $H_1$ receive additional pressure applied by the tooth mold 4a of the punch 4 and the tooth mold 7a of the intermediate die 7, and are converted into somewhat deeper teeth $G_2$ and grooves $H_2$ as the space $S_1$ is reduced in size to the space $S_2$, as shown in FIG. 4A.

Figure 5:
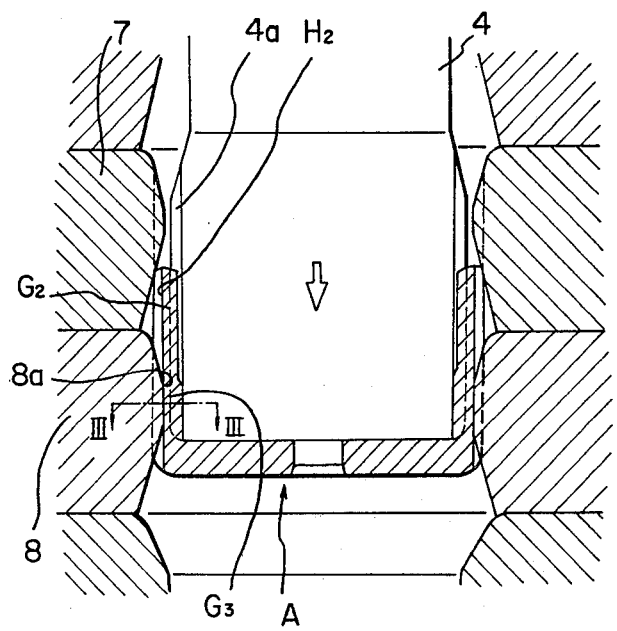
Figure 5A:
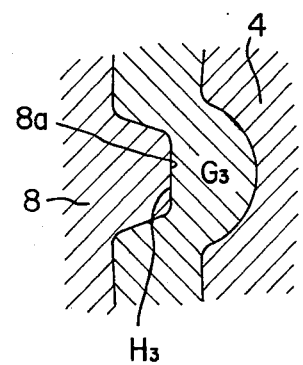
FIG. 5A is a sectional view taken along the line III—III of FIG. 5.

Next, in FIG. 5, the blank A which has passed through the initial and intermediate molding stages described above, is subjected to further pressure between the tooth mold 8a of the finishing mold 8 and the tooth mold 4a of the punch 4 as the punch 4 is lowered still further. Owing to the increase in pressure, the teeth $G_2$ and grooves $H_2$ are deformed and converted into an accurate finished teeth $G_3$ and grooves $H_3$, as the space $S_2$ is completely eliminated, thus ending the tooth molding operation. This condition is shown in FIG. 5A.

Figure 7:
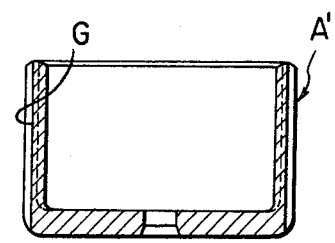
FIG. 7 is a sectional view of the intermediate product, illustrated in FIG. 1, having teeth formed thereon.
Figure 8:
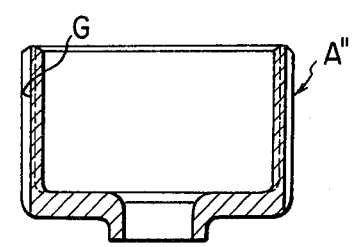
FIG. 8 is a sectional view of a final product whose bottom portion has been worked to form a boss for attaching the product to a shaft.
Figure 6:
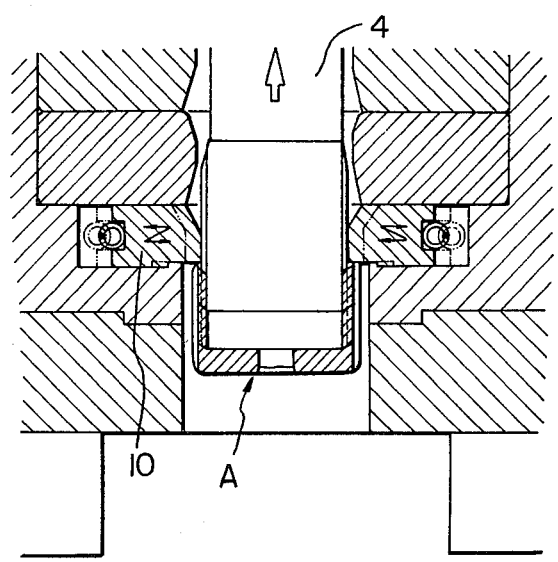
FIG. 6 is a sectional view showing a blank whose teeth are in the completely molded state.

In FIG. 6, the movable stoppers 10 are moved outwardly following the final molding step described above, allowing the blank to be removed from the lower end of the apparatus. Subsequently raising the punch 4 in the direction of the arrow in FIG. 6 completes one press-molding stroke. Thus, the teeth G are formed on the wall $A_1$ of the blank A, providing a toothed pulley A' which constitutes an intermediate product, as shown in FIG. 7. A toothed pulley A" is obtained as a final product by boring a hole through the bottom of the blank at the center thereof, and then by shaping this portion of the bottom into a boss for mounting on a rotary shaft.

In the foregoing embodiment, the dies are arranged vertically as preferred, which, however, will permit also other directional arrangements.

In accordance with the present invention as described hereinabove, coarse, intermediate and finishing dies, each having tooth molds of a different height, are vertically arranged in the mentioned order so that the tooth molds become pregressively greater in height from the top to the bottom of the apparatus. Thus axially extending teeth or grooves formed in a blank grow progressively deeper form one molding die stage to the next. Such an arrangement lightens greatly the molding load applied to a single one of the dies, especially the coarse die employed for the initial molding step. This precludes scoring of the die and molded surfaces and provides an extremely smooth molded surface. Moreover, since molding proceeds in good order without excessive stress, sagging of the teeth and the formation of draw or shrinkage marks as occur during the initial molding step do not readily occur and can be corrected for at the final stage. This makes it possible to mold highly precise teeth with a single pressing stroke, enabling a reduction in molding time with little expense for mold up-keep, while assuring that the mold will enjoy an extended life. The end result in a very low-cost molding operation.

What is claimed is:

1. In a pressing machine equipped with an upper plate, a lower plate, and a punch attached to the bottom surface of said upper plate for movement, an apparatus for molding a toothed pulley particularly a toothed belt, wherein the improvement comprises that a die holder is provided on said lower plate, and in that a plurality of dies, formed to include tooth molds having different tooth heights from one die to the next, are arranged in said die holder.

2. An apparatus as defined in claim 1, wherein said tooth molds have different increasing tooth heights from one die to the next.

3. An apparatus as defined in claim 1 or 2, wherein each die has a tooth mold provided with a gradually increasing tooth height.

4. An apparatus as defined in claim 1, wherein the dies are arranged vertically.

5. An apparatus as defined in claim 1, wherein the dies are positioned by means of a positioning pin.

* * * * *